Figure 2:
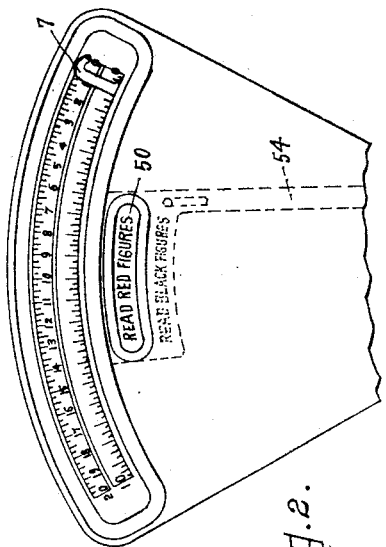

H. A. MYERS.
AUTOMATIC WEIGHING SCALE.
APPLICATION FILED JULY 5, 1916.

1,267,580.

Patented May 28, 1918.
4 SHEETS—SHEET 1.

INVENTOR.
Hubert A. Myers
by George R. Frye
Attorney

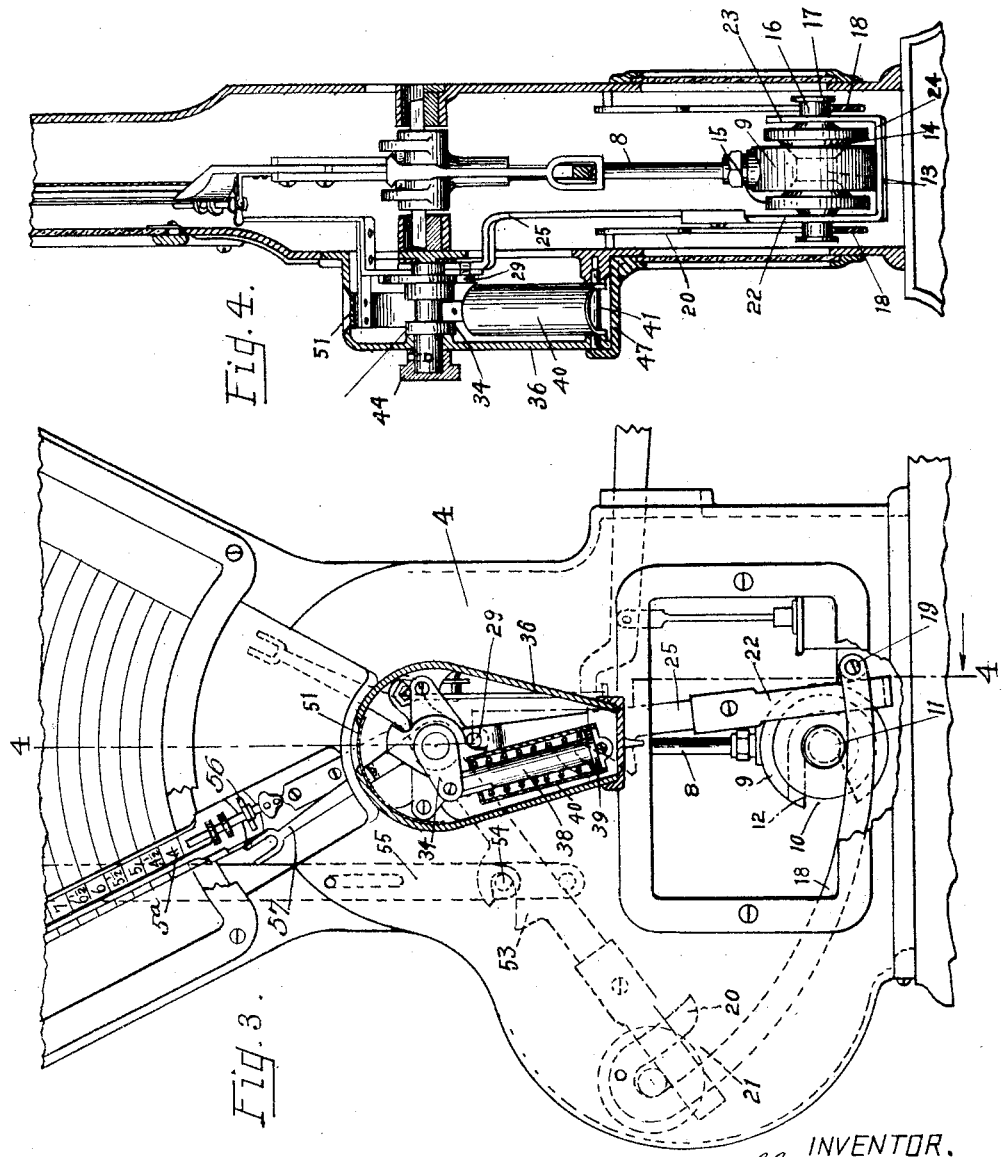

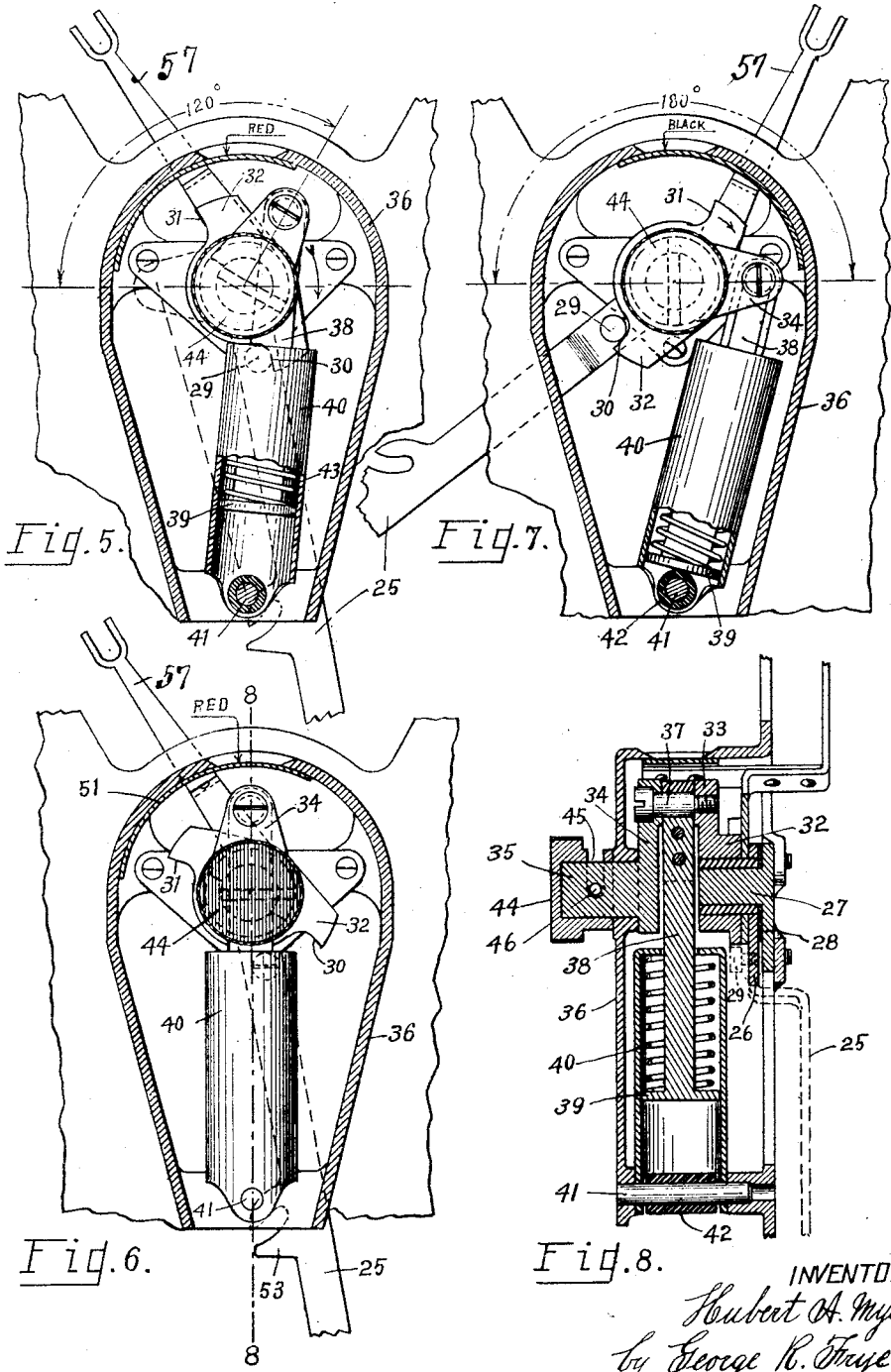

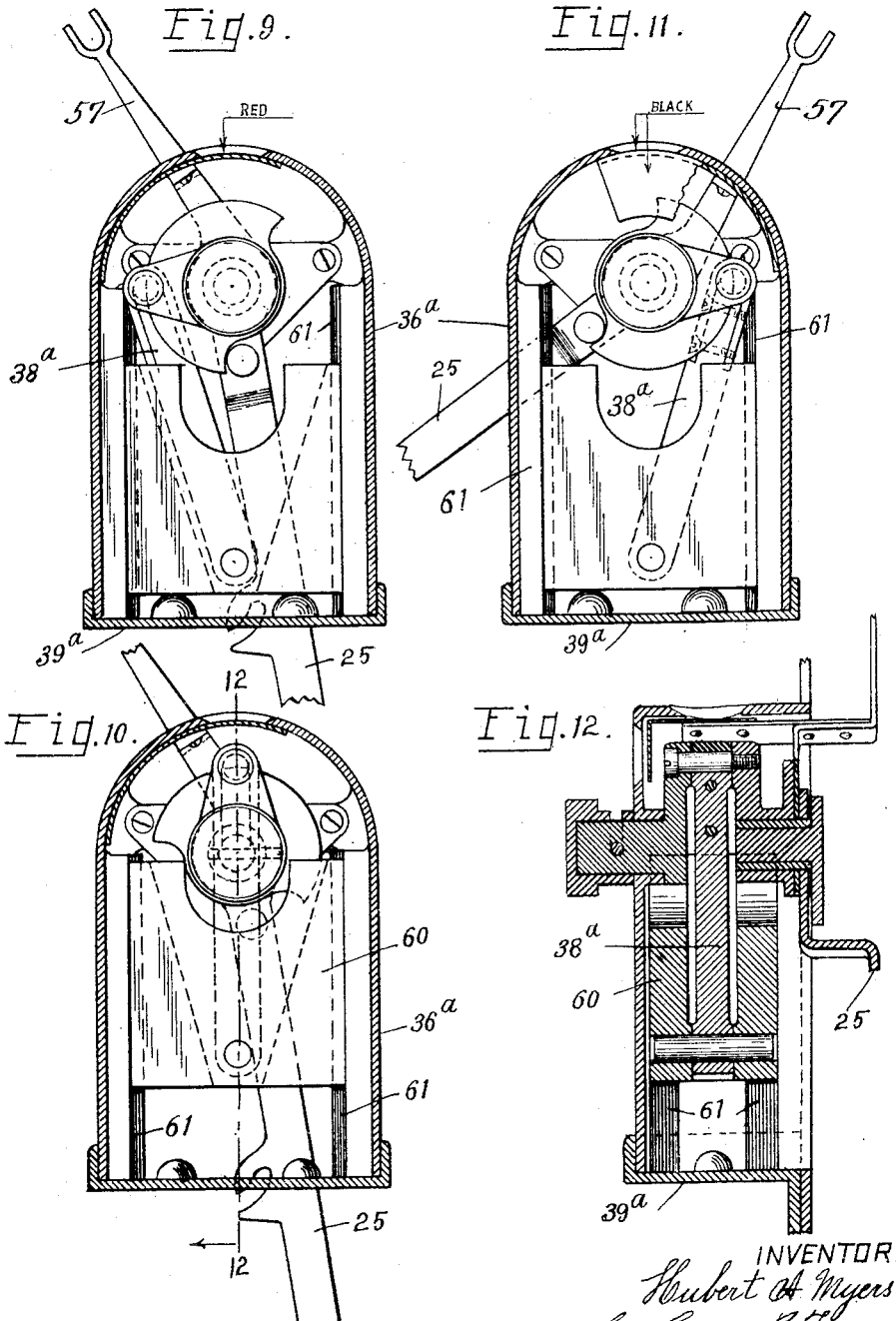

UNITED STATES PATENT OFFICE.

HUBERT A. MYERS, OF TOLEDO, OHIO, ASSIGNOR TO TOLEDO SCALE COMPANY, OF TOLEDO, OHIO, A CORPORATION OF NEW JERSEY.

AUTOMATIC WEIGHING-SCALE.

1,267,580.   Specification of Letters Patent.   Patented May 28, 1918.

Application filed July 5, 1916.   Serial No. 107,602.

*To all whom it may concern:*

Be it known that I, HUBERT A. MYERS, residing at Toledo, in the county of Lucas and State of Ohio, have invented certain new and useful Improvements in Automatic Weighing-Scales, of which the following is a specification.

My invention relates to pendulum weighing scales and is intended for, though not necessarily confined in all of its uses to, computing scales. In the particular type of pendulum computing scales to which my invention is especially adapted, it is customary to employ a chart or table of computations and weights together with an index hand carried by the pendulum and arranged to swing over such chart or table, said hand having inscribed upon it one or more rows of price numerals. The pendulum is appropriately connected with a scale beam carrying a platter on which the commodity to be weighed is placed. The weight of such commodity causes the index hand to move over the chart and properly indicate the weight of the commodity by pointing to one of the weight numerals on the chart or a graduation mark associated therewith. The particular numerals on the index hand denoting the price per pound or other unit of measure locate the proper computation, the index hand being usually formed along one side in such manner as to assist in locating a computation, as for example, being provided with a taut reading wire spaced a short distance from the face of the chart. To provide for an increased weighing capacity such as effected through an increase in weight of the pendulum by means of the placing of an auxiliary weight thereon, it is customary to inscribe two rows of weight numerals on the chart, one representing double the weighing capacity of the first and providing upon the index hand two rows of price numerals, each numeral of one row being double the companion numeral of the other row. Contrasting colors are ordinarily employed so that the user of the scale, as well as the customer, may readily perceive whether the scales are being used under one weighing capacity or the other.

The principal object of the present invention is to provide improved means for placing an auxiliary weight on the pendulum and removing it therefrom and insure its being held in proper position when either on or off the pendulum, which means render it entirely unnecessary for the user of the scales to handle the auxiliary weight, the latter remaining at all times within the casing of the machine. Thus the invention provides for the removal of the auxiliary weight from the pendulum by simply turning a knob which protrudes from the casing of the scale, the carrier for the auxiliary weight being then automatically lifted, caught, and held beyond the range of the pendulum's swing. The replacing of the auxiliary weight upon the pendulum involves merely the turning of the knob in the opposite direction, said carrier and the auxiliary weight being thus caused to fall by gravity and also being urged by mechanical means to travel its full predetermined distance, the said weight being automatically deposited upon the pendulum while the carrier takes up a position out of the range of the pendulum's swing. More specifically stated, this object is to effectually guard against any possible escape of the auxiliary weight in the processes of its removal from, or replacement upon, the pendulum, and insure its being held in proper position when either on or off the pendulum, even though the manipulation of parts provided for the proper handling of the auxiliary weight be done carelessly or with intentional violence or in attempt to defraud.

With this and incidental objects in view, the invention consists in certain novel features of construction, arrangement and combination of parts, the essential elements whereof are recited in the appended claims and preferred embodiments of which are illustrated in the accompanying drawings, wherein the same reference numerals designate the same or similar parts throughout the several views.

In the drawings:—

Figure 1:
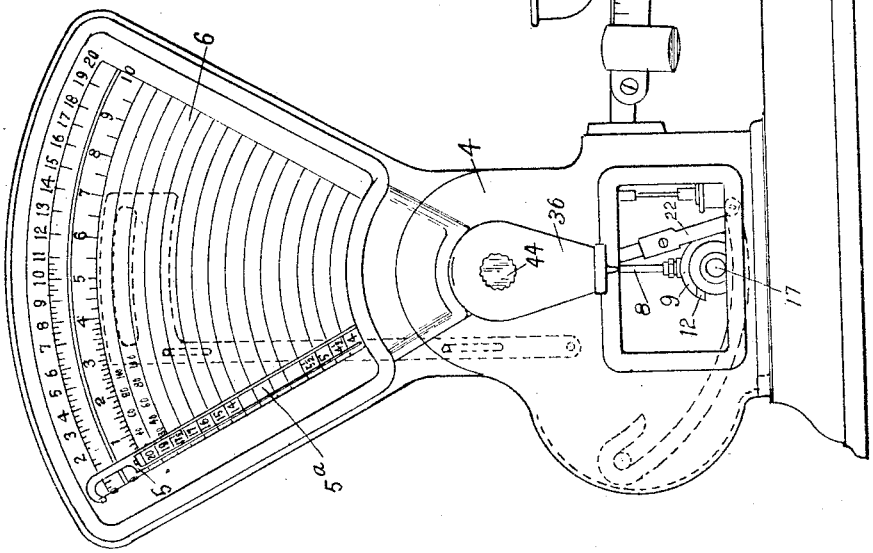

Figure 1 is a front elevation of a pendulum weighing scale with my improvements embodied therein; Fig. 2 is a rear elevation of the upper portion of the chart housing; Fig. 3 is an enlarged detail view of portions of the scale, partly in front elevation and partly in longitudinal section, the auxiliary weight being shown in full lines in position upon the pendulum, and in dotted lines in the position in which it is held when removed from the pendulum; Fig. 4 is a vertical transverse section taken substantially on the line 4—4 of Fig. 3; Figs. 5 and 6 are enlarged detail views of my improved mechanism for effecting the transfer of the auxiliary weight to or from the pendulum shown in intermediate positions; Fig. 7 is a similar view with the parts shown in the position assumed when the weight is held away from the pendulum; Fig. 8 is a longitudinal sectional view taken substantially on the line 8—8 of Fig. 6; Fig. 9 is an enlarged detail view of a modified embodiment of the weight transferring means, the parts being shown in the position assumed when the weight is upon the pendulum; Fig. 10 is a similar view with the parts shown in an intermediate position; Fig. 11 is a similar view with the parts shown in the position assumed when the auxiliary weight is held away from the pendulum; and Fig. 12 is a longitudinal sectional view on the line 12—12 of Fig. 10.

It will not be necessary to give a detailed description of the particular type of computing scales here chosen for the purposes of illustrating the preferred embodiments of my invention because that type of scale has become well-known through extensive commercial use and a considerable number of prior patents, for example, the patent to Wetzel, No. 998,220, dated July 18, 1911.

The reference numeral 1 designates a suitable base above which is fulcrumed the scale beam 2, supporting a scale pan or platter 3 and connected within the housing 4 with an index hand 5 which moves over a computing chart 6 and has a rear portion 7 moving over two rows of weight numerals on the rear side of the chart plate (see Fig. 2). Corresponding rows of weight numerals appear on the front side of said plate just above the chart or table of computations (see Fig. 1) and it is customary to inscribe them in contrasting colors. As shown, the upper row provides for double the weight capacity of the lower row and the index arm 5 ordinarily bears two vertical rows of numerals correspondingly contrasted and denoting prices per unit of weight, one row for use when the scales are weighing in one weight capacity, and the other row being used when the scales are weighing in the other weight capacity. Preferably the two vertical rows on the index arm 5 are inscribed on opposite sides of a rotatable strip or bar 5ª suitably journaled in bearings carried by the index arm, this strip or bar being so located upon the index arm that when turned with either side facing outwardly the numerals thus presented to view will register with the various rows of numerals upon the computing chart to co-act therewith in locating the proper computation on the chart. The vertical rows on the strip or bar 5ª are preferably formed of contrasting colors, as for example, one of red and one of black.

The index arm 5 is compounded with a pendulum 8 arranged to swing within the housing 4, and it will be understood that the different sets of weight and price numerals are to be read according to the weighing effected by the pendulum. The latter carries at its lower end a permanent weight 9 of disk-like form made with a radial and slightly flaring opening 10 entering one side and extending around the center of the disk concentrically therewith. The concentric portion of the side of this opening extends through more than a half circle and the lower edge of the opening beyond the concentric portion diverges from the upper edge. Thus a slight depression 11 is formed in the lower side of the radial opening at the inner end thereof, as clearly shown in Fig. 3. The portion of the weight disk 9 immediately surrounding said radial opening is substantially V-shaped in cross section, although this formation is preferably not continued to a sharp edge but terminates in a narrow flat surface 12. The auxiliary weight takes something the shape of a dumb-bell, comprising a reduced central portion 13 of the same lateral extent as the said flat surface 12 of the permanent weight and the two side portions 14 in the shape of truncated cones, whose angles correspond with those of the V-shaped portions of the permanent weight, as clearly shown in Fig. 4. Beyond the side portions 14 the auxiliary weight is provided with flanges 15 designed to take over the sides of the permanent weight beyond the V-shaped portions thereof, and from the centers of the flanged heads of the auxiliary weight project trunnions 16 with flanged ends 17 for a purpose presently to be described.

Without proceeding further it will be seen that the above-described formation of the permanent and auxiliary weights is calculated to insure a perfectly accurate and correct engagement between them and one which cannot readily be disturbed when once established. The reduced central portion 13 of the auxiliary weight resting in the depression 11 of the permanent weight insures against the accidental removal of the auxiliary weight in a radial direction, and the engagement of the conical portions 14 of the auxiliary weight with the V-shaped portions of the permanent weight serves to insure the auxiliary weight's properly entering the opening in the permanent weight and taking up the proper position therein. The flanges also serve to prevent any possible axial displacement of the auxiliary weight. As will hereinafter appear, this particular constructional formation of weights is also a peculiar advantage in connection with means hereinafter described for removing or replacing the weight at will.

Proceeding now to a description of the means employed for controlling the auxiliary weight, the numeral 18 designates a pair of guide rails mounted within the housing 4 and constituting a track upon which the auxiliary pendulum weight may travel. These rails are secured at one end in the base of the housing, as indicated at 19, on opposite sides of the pendulum somewhat beyond the limit of the latter's downward swing and they pass the permanent pendulum weight 9 on opposite sides thereof at a level slightly below the depressed portion 11 of the opening in said weight. These rails thence curve upwardly and extend to a point beyond the limits of the upward swing of the pendulum, then curving back over themselves, as at 20, to form guideways or runways 21. The trunnions 16 of the auxiliary pendulum weight extend over these rails respectively and the flanges 17 take over the outer sides of the rail. It will be seen, therefore, that this auxiliary weight may roll up and down the track formed by said rails without danger of leaving the same and always preserved in proper position to enter and leave the opening in the permanent pendulum. The runways 21 provide for the auxiliary weight being maintained in proper position when not engaged with the permanent weight, and when the scales are in use at the lower weight capacity this auxiliary pendulum weight is retained in the upper ends of the runways 21, the permanent weight 9 being then free to swing through its arc without being at all influenced by the additional devices employed to change the capacity of the scales.

The auxiliary weight is moved upwardly on its track and held in its inoperative position by means of a hanger arranged to travel between the rails 18 and comprising arms 22—23 acting against the trunnions 16 and a connecting bar 24 between said arms, the latter sufficiently lowered to pass underneath the pendulum weight 9. The arm 22 of this hanger is secured to a pendent arm 25 which has a hub 26 journaled upon a stub shaft 27 carried by a triangular bracket plate 28 fastened at the front of the housing 4 concentrically with the fulcrum of the pendulum, as shown in Fig. 4. Said arm 25 and the hanger are secured together to form a unitary structure arranged to swing upon a center coincident with that of the pendulum, and through a range of movement sufficient to carry the auxiliary weight beyond the upward swing of the pendulum weight 9, and also to leave the pendulum free as to the extent of its downward swing in carrying the auxiliary weight, as shown in Figs. 1 and 3.

The means for operating the auxiliary weight carrier composed of the arm 25 and hanger as above mentioned will now be described. The hanger 25 adjacent its hub 26 is provided with a forwardly-extending stud 29 extending into the path of and adapted to be engaged by the opposite faces 30 and 31 of a rotatable thrust plate 32 journaled upon the stub shaft 27. A crank arm 33 is rigidly secured with the thrust plate 32 and co-acts with a similar crank arm 34 formed upon the stub shaft 35 journaled within an aperture in a casing 36 adapted to inclose the operating mechanism for the auxiliary pendulum weight. The crank arms 33 and 34 are connected by a cross-pin 37 upon which is pivotally mounted the upper end of a plunger 38, the lower extremity of which is formed with a head 39 fitting within the cylinder 40. The cylinder is pivotally mounted at its lower extremity upon a stud 41 which also serves to secure the lower end of the casing 36 to the front of the casing 4. A rubber bumper 42 is preferably provided on the stud 41 to cushion the downward movement of the plunger 38 in the operation of the weight transferring mechanism. The cylinder 40 is provided with abutments adjacent its upper extremity for the upper end of a coil spring 43, the lower extremity of which engages against the head 39 of the plunger 38, as clearly shown in Figs. 3 and 8. The stub shaft 35 is loosely encircled by a corrugated or knurled knob 44, the hub of which is preferably provided with an elongated slot 45, the end walls of which coöperate with a radially-extending pin 46 on the stub shaft 35. The pin 46 also serves to prevent accidental displacement of the knob 44. A base plate 47 covers the lower opening of the casing 36 so as to prevent the entrance of dust, etc.

To indicate in which weight capacity the operator is weighing, an indicator plate 50 is arranged directly behind an opening in the rear of the housing 4 (see Fig. 2), this indicator plate bearing the inscriptions "Read red figures" and "Read black figures," said inscriptions being alternately displayed as the auxiliary pendulum weight is moved on or off the pendulum. Also means are provided for rotating the strip or bar 5ª simultaneously with the transfer of the auxiliary pendulum weight. As herein shown, a star wheel 56 is mounted on the lower extremity of the strip 5ª and co-acts with the forked or bifurcated arm 57 carried by the hanger 25. A bi-colored plate 51 is also arranged to be swung across an opening 52 in the top of the housing 36 as the auxiliary weight is transferred.

Operation: With the scale operating at the higher weight capacity the parts will be relatively positioned as shown in full lines in Figs. 1 and 3, the auxiliary pendulum weight being, of course, upon the pendulum to augment its counterbalancing effect in the weighing of commodities. The hanger 25 has left contact with the auxiliary weight and maintains a position beyond the same so as to leave the pendulum entirely free from any counteracting influence. At this time the indicator plate 50 displays the inscription "Read red figures" through an opening in the rear of the housing 4 (see Fig. 2) and the side of the rotatable strip or bar 5ª exhibiting red figures is displayed while the red portion of the bi-colored plate 51 may be shown through an opening 52 in the top of the housing 36. To adjust the scale for the lower weight capacity it is only necessary to turn the knob 44 to the right. The first effect will be to move the knob 44 on the stub shaft 35 until one end wall of the slot 45 contacts with the pin 46, then further rotation will rotate the crank arms 33—34 and the thrust plate 32 to bring the face 30 of said thrust plate into engagement with the forwardly projecting stud 29 on the hanger 25, the movement of the crank arms 33—34 and the cross-pin 37 serving to raise the plunger 38 against the tension of the spring 43. The parts just described will now have assumed the position shown in Fig. 5, the crank arms having moved from their normal positions shown in Fig. 3 of the drawings past the center line position shown in Fig. 6 (at which point the spring 43 is compressed to its greatest extent) and has started downwardly, being aided in its downward rotation by the compressed spring.

It will be seen, therefore, that the force of the spring 43 will carry the face 30 of the thrust plate 32 into engagement with the stud 29 and then move said plate, stud and hanger 25 to the other extremity of their movements, the force of the spring carrying the plunger 38 and attached parts to the extreme position shown in Fig. 7 of the drawings. The bumper 42 on the stud 41 serves to cushion the thrust of the plunger. In this movement effected by the compressed spring 43 the arm 25 and hanger are swung from one extreme position to the other and the auxiliary pendulum weight is contacted thereby, carried out of the radial opening in the permanent pendulum weight, and rolled up the inclined track provided by the rails 18 until the auxiliary weight passes beyond the limits of the pendulum's swing. This movement effected by the compressed spring cannot be prevented by the operator holding the knob 44, as the stub shaft 35 and radial pin 46 are moved relatively to the knob 44, the pin traveling from one end of the slot to the other, even though attempt is made to retard the movement of the weight transferring means by holding the knob 44. As the arm 25 moves upwardly in this weight removing operation, the projection 53 (see Figs. 3 and 6) engages the pin 54 carried adjacent the lower end of the indicator staff 55 and raises the indicator staff and indicator plate 50 carried thereby (Fig. 2) so as to change the indication showing through the opening in the rear of the housing, this new inscription preferably being "Read black figures." Also the bifurcated arm 57 is swung into engagement with the star wheel 56 to turn the rotatable strip or bar 5ª on the index arm 5 so that the row of numerals inscribed in black will be displayed, and the black portion of the bi-colored strip 51 will be swung into alinement with the opening in the top of the casing 36.

To replace the auxiliary pendulum weight on the pendulum it is simply necessary to turn the knob 44 to the left until the opposite end wall of the slot 45 in the knob contacts with the pin 46, further rotation of the knob then moving the crank arms 33—34 and the thrust plate 32 to bring the face 31 on said plate into engagement with the opposite side of the stud 29 on the arm 25 and raising the plunger 38 within the cylinder 40 to compress the spring 43. As soon as the rotation of the crank arms 33 and 34 has carried them beyond the uppermost or central position (see Fig. 6), the spring 43 will expand and force the plunger 38 and crank arms downwardly, exerting a pressure sufficient to carry the arm 25 and the auxiliary pendulum weight downwardly, whereby the auxiliary weight enters the radial opening 10 in the permanent pendulum weight and seats itself within the depression 11 therein, and the hanger moving to a position beyond the pendulum so as to leave the pendulum entirely free to swing in its load-counterbalancing movements. During the falling movement of the hanger and auxiliary weight, the arm 25 draws down the indicator plate 54 so as to change the indication at the back of the scale, and suitable means are also set in operation to turn the rotatable strip or bar 5ª on the index arm 5 and swing the bi-colored plate 51 within the casing 36.

In Figs. 9–12 inclusive is shown a modification whereby gravity-acting means is substituted for the spring 43, the manual raising and subsequent fall of a weight 60 being utilized to insure the completion of the movement of the hanger 25 and auxiliary pendulum weight to one or the other extreme of its path of movement. The lower end of the weight 60 rests upon the head 39ª of the plunger 38ª and the weight is guided in its up and down movements by means of guides 61 at the sides of the casing 36ª.

The remaining elements of this embodiment of the weight transferring mechanism are identical with those employed in the embodiment hereinbefore described, and the operation of this embodiment is substantially identical with that of the first-mentioned embodiment, the weight 60 being raised from its normal position during the rotation of the crank arms to their central or uppermost position, and then falling from this raised position to its normal position, thereby exerting pressure upon the crank arms and associated mechanism to force the hanger 25 and auxiliary weight to the extremes of their path of movement.

It will be seen that the means above described for controlling the transfer of the auxiliary pendulum weight does not depend at all on any particular position which the pendulum may occupy, and hence it is not necessary to provide any means for positioning the pendulum in removing the auxiliary weight therefrom or in replacing said weight thereon.

Also the spring 43 and the weight 60 are so arranged relatively to the weight transferring mechanism that whenever attempt is made to move the hanger arm and auxiliary pendulum weight, the movement must be completed—i. e., the spring 43 or weight 60 through the intermediate mechanism will force the hanger arm and auxiliary weight to at all times remain at one or the other extreme of its path of movement.

While it will be apparent that the illustrated embodiments of my invention herein shown are well calculated to adequately fulfil the objects primarily stated, it will be understood that the construction is susceptible to modification, variation and change without departing from the spirit and scope of the invention as set forth in the subjoined claims.

Having described my invention, I claim:

1. The combination with pendulum scales, of an auxiliary weight for the pendulum, mechanical operating means for displacing and replacing the weight including a shaft, a crank arm thereon, and means connected with the crank arm for forcing said weight to travel its full extent of movement when moved from or toward the pendulum.

2. The combination with pendulum scales, of an auxiliary weight for the pendulum, mechanical operating means for displacing and replacing the weight including a shaft, a crank arm thereon, and gravity-acting means connected with the crank arm for forcing said weight to travel its full extent of movement when moved from or toward the pendulum.

3. The combination with pendulum scales, of an auxiliary weight for the pendulum, mechanical means for displacing and replacing said weight, comprising a hanger arm adapted to be swung to engage the weight to remove it from the pendulum and to allow the return of the weight to the pendulum, a shaft on which said hanger arm is mounted, a crank on said shaft, and means connected with said crank for forcing the hanger arm to travel the full extent of its movement when swung in either direction.

4. The combination with pendulum scales, of an auxiliary weight for the pendulum, mechanical means for displacing and replacing said weight, comprising a hanger arm adapted to be swung to engage the weight to remove it from the pendulum and to allow the return of the weight to the pendulum, a shaft on which said hanger arm is mounted, a crank on said shaft, and gravity-acting means connected with said crank for forcing the hanger arm to travel the full extent of its movement when swung in either direction.

5. The combination with pendulum scales, of an auxiliary weight for the pendulum, mechanical means for displacing and replacing said weight, comprising a hanger arm adapted to be swung to engage the weight to remove it from the pendulum and to allow the return of the weight to the pendulum, and gravity-acting means for forcing the hanger arm to travel the full extent of its movement when swung in either direction.

6. The combination with pendulum scales, of an auxiliary weight for the pendulum, a track upon which said weight may travel into and out of engagement with the pendulum, a swinging arm for propelling the weight along said track and supporting it when not engaged with the pendulum, and gravity-acting means for forcing said arm to swing the full extent of its travel when swung in either direction.

7. The combination with pendulum scales, of an auxiliary weight for the pendulum, a track upon which said weight may travel into and out of engagement with the pendulum, a swinging arm for propelling the weight along said track and supporting it when not engaged with the pendulum, a shaft on which said hanger arm is mounted, a crank on said shaft, and means connected with the crank for forcing said arm to swing the full extent of its travel when swung in either direction.

8. The combination with pendulum scales, of an auxiliary weight for the pendulum, a track upon which said weight may travel into and out of engagement with the pendulum, a swinging arm for propelling the weight along said track and supporting it when not engaged with the pendulum, a shaft on which said hanger arm is mounted, a stud projecting from said hanger arm adjacent the shaft, rotatable means mounted on the shaft adapted to engage said stud, a crank arm connected with said rotatable means, and means connected with the crank arm for forcing said arm to swing the full extent of its travel when swung in either direction.

9. The combination with pendulum scales, of an auxiliary weight for the pendulum, a track upon which said weight may travel into and out of engagement with the pendulum, a swinging arm for propelling the weight along said track and supporting it when not engaged with the pendulum, a shaft on which said hanger arm is mounted, a stud projecting from said hanger arm adjacent the shaft, rotatable means mounted on the shaft adapted to engage said stud, a crank arm connected with said rotatable means, and gravity-acting means connected with the crank arm for forcing said arm to swing the full extent of its travel when swung in either direction.

10. The combination with pendulum scales, of an auxiliary weight for the pendulum, a track upon which said weight may travel into and out of engagement with the pendulum, a swinging arm for propelling the weight along said track and supporting it when not engaged with the pendulum, a shaft on which said hanger arm is mounted, a stud projecting from said hanger arm adjacent the shaft, a thrust plate mounted on the shaft adapted to engage said stud, a crank arm connected with said thrust plate, and means connected with the crank arm for forcing said hanger arm to swing the full extent of its travel when swung in either direction.

11. The combination with pendulum scales, of an auxiliary weight for the pendulum, a track upon which said weight may travel into and out of engagement with the pendulum, a swinging arm for propelling the weight along said track and supporting it when not engaged with the pendulum, a shaft on which said hanger arm is mounted, a stud projecting from said hanger arm adjacent the shaft, a thrust plate mounted on the shaft adapted to engage said stud, a crank arm connected with said thrust plate, and gravity-acting means connected with the crank arm for forcing said hanger arm to swing the full extent of its travel when swung in either direction.

12. The combination with pendulum scales, of an auxiliary weight for the pendulum, mechanical operating means for displacing and replacing the weight, comprising a shaft, a hanger arm mounted thereon, a crank mounted on the shaft, a plunger connected with the crank, a weight supported on the plunger, and means for manually rotating the crank.

13. The combination with pendulum scales, of an auxiliary weight for the pendulum, a track upon which said weight may travel into and out of engagement with the pendulum, a swinging arm for propelling the weight along the track and supporting it when out of engagement with the pendulum, and means for swinging said arm comprising rotatable means adapted to engage the hanger arm and including a crank, a plunger pivotally connected with the crank, and a weight carried by the plunger.

14. The combination with pendulum scales, an auxiliary weight for the pendulum, a track upon which said weight may travel into and out of engagement with the pendulum, a swinging arm for propelling the weight along the track and supporting it when out of engagement with the pendulum, and means for swinging said arm comprising rotatable means adapted to engage the hanger arm, and including a crank, a plunger pivotally connected with the crank, a weight supported upon and adapted to be raised and lowered with the plunger upon the rotation of the crank, and means for cushioning the falling movement of the weight and plunger.

HUBERT A. MYERS.

Witnesses:
GEORGE R. FRYE,
KARL E. HAYES.

Copies of this patent may be obtained for five cents each, by addressing the "Commissioner of Patents, Washington, D. C."